United States Patent
Goto

(10) Patent No.: US 9,843,444 B2
(45) Date of Patent: Dec. 12, 2017

(54) COMMUNICATION APPARATUS, CONTROL METHOD, AND STORAGE MEDIUM

(71) Applicant: CANON KABUSHIKI KAISHA, Tokyo (JP)

(72) Inventor: Fumihide Goto, Naka-gun (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 188 days.

(21) Appl. No.: 13/859,557

(22) Filed: Apr. 9, 2013

(65) Prior Publication Data

US 2013/0297938 A1    Nov. 7, 2013

(30) Foreign Application Priority Data

May 1, 2012 (JP) ................................. 2012-104883

(51) Int. Cl.
*H04L 9/08* (2006.01)
*H04W 12/06* (2009.01)
*H04W 84/18* (2009.01)

(52) U.S. Cl.
CPC .......... *H04L 9/0844* (2013.01); *H04L 9/0866* (2013.01); *H04W 12/06* (2013.01); *H04W 84/18* (2013.01)

(58) Field of Classification Search
CPC .... H04L 9/3273; H04L 9/0844; H04L 9/0814
USPC .......................................................... 713/171
See application file for complete search history.

(56) References Cited

U.S. PATENT DOCUMENTS

| 4,159,468 A | * | 6/1979 | Barnes | H04L 9/0637 713/181 |
| 4,306,111 A | * | 12/1981 | Lu | H04L 9/302 380/30 |
| 4,893,339 A | * | 1/1990 | Bright | H04K 1/02 380/269 |

(Continued)

FOREIGN PATENT DOCUMENTS

| JP | 2008-099112 A | 4/2008 | |
| WO | 2006-098116 | 9/2006 | ............. H04L 12/28 |

OTHER PUBLICATIONS

Housley et al., "Guidance for Authentication, Authorization, and Accounting (AAA) Key Management", RFC 4962, 2007.*

(Continued)

*Primary Examiner* — Ondrej Vostal
(74) *Attorney, Agent, or Firm* — Fitzpatrick, Cella, Harper & Scinto

(57) ABSTRACT

Disclosed is a communication apparatus for executing processing for sharing an encryption key between itself and another party's communication apparatus, wherein the communication apparatus executes the processing, respectively at least one time, as an authenticating apparatus and an authenticated apparatus. The communication apparatus determines which encryption key of an encryption key provided by this communication apparatus and an encryption key provided by the other party's communication apparatus is the encryption key used in common by this communication apparatus and the other party's communication apparatus, and decides, in accordance with result of the determination, which of this communication apparatus and the other party's communication apparatus is to be made the authenticating apparatus first.

8 Claims, 14 Drawing Sheets

(56) References Cited

U.S. PATENT DOCUMENTS

| | | | | |
|---|---|---|---|---|
| 5,241,599 | A * | 8/1993 | Bellovin | H04L 9/0844 380/28 |
| 5,301,247 | A * | 4/1994 | Rasmussen | H04L 9/0637 380/277 |
| 5,345,506 | A * | 9/1994 | Tsubakiyama et al. | 713/171 |
| 5,455,862 | A * | 10/1995 | Hoskinson | H04L 9/0844 380/244 |
| 5,995,624 | A * | 11/1999 | Fielder | H04L 9/0822 380/283 |
| 6,028,933 | A * | 2/2000 | Heer | H04L 63/04 380/212 |
| 6,058,476 | A * | 5/2000 | Matsuzaki et al. | 713/169 |
| 6,721,886 | B1 * | 4/2004 | Uskela | H04W 12/06 713/168 |
| 7,024,553 | B1 * | 4/2006 | Morimoto | H04L 9/083 380/273 |
| 7,139,908 | B2 | 11/2006 | Hamamoto et al. | 713/2 |
| 7,218,643 | B1 * | 5/2007 | Saito | H04H 20/02 370/395.52 |
| 7,350,069 | B2 * | 3/2008 | Herz | G06T 1/005 380/273 |
| 7,620,187 | B1 * | 11/2009 | Didier et al. | 380/279 |
| 7,720,227 | B2 * | 5/2010 | Kaji | H04L 29/06027 380/259 |
| 8,483,393 | B2 * | 7/2013 | Robert | H04N 7/163 380/200 |
| 8,489,879 | B2 * | 7/2013 | Sugiyama | G06F 9/544 370/277 |
| 8,555,057 | B2 * | 10/2013 | Raftelis | H04L 63/164 713/150 |
| 8,874,915 | B1 * | 10/2014 | Rodoper | H04L 63/061 380/278 |
| 2002/0019944 | A1 * | 2/2002 | Kou | 713/200 |
| 2002/0066018 | A1 * | 5/2002 | Linnartz | H04L 9/3226 713/171 |
| 2002/0154781 | A1 * | 10/2002 | Sowa et al. | 380/278 |
| 2003/0149876 | A1 * | 8/2003 | McGough | H04L 9/0844 713/171 |
| 2003/0182576 | A1 * | 9/2003 | Morlang | H04L 63/0428 713/171 |
| 2003/0200432 | A1 * | 10/2003 | Washio | G06F 21/10 713/168 |
| 2004/0078566 | A1 * | 4/2004 | Barber | H04L 12/2856 713/161 |
| 2004/0093523 | A1 * | 5/2004 | Matsuzaki et al. | 713/201 |
| 2004/0103316 | A1 * | 5/2004 | Gehrmann | H04L 63/065 713/171 |
| 2004/0162983 | A1 * | 8/2004 | Gotoh | H04L 9/0841 713/171 |
| 2004/0259529 | A1 * | 12/2004 | Suzuki | 455/411 |
| 2005/0050323 | A1 * | 3/2005 | Mizrah | H04L 9/0844 713/168 |
| 2005/0138374 | A1 * | 6/2005 | Zheng | H04L 9/0894 713/166 |
| 2005/0251680 | A1 * | 11/2005 | Brown | H04L 63/061 713/171 |
| 2006/0008082 | A1 * | 1/2006 | Gluck | H04L 63/0428 380/28 |
| 2006/0143453 | A1 * | 6/2006 | Imamoto et al. | 713/169 |
| 2006/0248331 | A1 * | 11/2006 | Harkins | H04L 9/0822 713/155 |
| 2007/0058808 | A1 * | 3/2007 | Rudolf | H04L 9/0841 380/44 |
| 2007/0067644 | A1 * | 3/2007 | Flynn | G06F 12/1408 713/189 |
| 2007/0150720 | A1 * | 6/2007 | Oh | H04L 63/065 713/153 |
| 2007/0192599 | A1 * | 8/2007 | Kato et al. | 713/168 |
| 2007/0230706 | A1 * | 10/2007 | Youn | G06Q 20/3829 380/277 |
| 2007/0288753 | A1 * | 12/2007 | Gehrmann | H04L 9/0841 713/171 |
| 2008/0019520 | A1 * | 1/2008 | Nakahara | H04L 9/0822 380/247 |
| 2008/0059789 | A1 * | 3/2008 | Lucidarme | 713/153 |
| 2008/0063196 | A1 * | 3/2008 | Evans | G06F 21/10 380/200 |
| 2008/0082824 | A1 * | 4/2008 | Ibrahim | G06F 21/72 713/171 |
| 2009/0006839 | A1 * | 1/2009 | Matsuoka | H04L 9/083 713/150 |
| 2009/0028101 | A1 | 1/2009 | Kakumaru | 370/329 |
| 2009/0043681 | A1 * | 2/2009 | Shoji et al. | 705/35 |
| 2009/0067421 | A1 * | 3/2009 | Linden | H04L 63/0428 370/389 |
| 2009/0073943 | A1 * | 3/2009 | Krishnaswamy | H04W 88/04 370/338 |
| 2009/0083833 | A1 * | 3/2009 | Ziola et al. | 726/2 |
| 2009/0144202 | A1 * | 6/2009 | Hurry | 705/67 |
| 2009/0144548 | A1 * | 6/2009 | Tzavidas et al. | 713/169 |
| 2009/0147957 | A1 * | 6/2009 | Murray | H04L 63/166 380/259 |
| 2009/0158390 | A1 * | 6/2009 | Guan | 726/2 |
| 2009/0172399 | A1 * | 7/2009 | Schmid | G06Q 10/107 713/168 |
| 2009/0177894 | A1 * | 7/2009 | Orsini | G06F 21/6209 713/193 |
| 2009/0235339 | A1 * | 9/2009 | Mennes et al. | 726/5 |
| 2009/0327730 | A1 * | 12/2009 | Deishi | H04L 63/0435 713/171 |
| 2010/0031036 | A1 * | 2/2010 | Chauncey et al. | 713/168 |
| 2010/0058060 | A1 * | 3/2010 | Schneider | H04L 9/3271 713/171 |
| 2010/0091993 | A1 * | 4/2010 | Iwama | H04W 12/04 380/273 |
| 2010/0131762 | A1 * | 5/2010 | Wu | H04L 63/06 713/170 |
| 2010/0161989 | A1 * | 6/2010 | Kosaki | H04L 63/061 713/171 |
| 2010/0169645 | A1 * | 7/2010 | McGrew | H04L 9/0822 713/170 |
| 2010/0208897 | A1 * | 8/2010 | Goto | H04L 9/0816 380/279 |
| 2010/0299522 | A1 * | 11/2010 | Khambete | 713/168 |
| 2010/0325436 | A1 * | 12/2010 | Huang | H04L 9/0847 713/171 |
| 2011/0075847 | A1 * | 3/2011 | Rossi | H04L 9/0822 380/279 |
| 2011/0119487 | A1 * | 5/2011 | Alexander | H04L 9/0891 713/160 |
| 2011/0142236 | A1 * | 6/2011 | Nica | H04L 63/06 380/255 |
| 2011/0145579 | A1 * | 6/2011 | Shin et al. | 713/169 |
| 2011/0154041 | A1 * | 6/2011 | Godfrey | H04W 12/04 713/171 |
| 2011/0208967 | A1 * | 8/2011 | Nakano et al. | 713/169 |
| 2011/0258439 | A1 * | 10/2011 | Orsini | H04L 9/085 713/165 |
| 2011/0316911 | A1 | 12/2011 | Ishikawa et al. | 347/9 |
| 2012/0027214 | A1 * | 2/2012 | Yokota | G06F 21/10 380/286 |
| 2012/0045059 | A1 * | 2/2012 | Fujinami | H04L 9/0866 380/273 |
| 2012/0054359 | A1 * | 3/2012 | Yamada | 709/229 |
| 2012/0084557 | A1 * | 4/2012 | Futa et al. | 713/156 |
| 2012/0106449 | A1 * | 5/2012 | Shibuya | 370/328 |
| 2012/0204030 | A1 * | 8/2012 | Nossik | H04L 9/0822 713/168 |
| 2012/0204032 | A1 * | 8/2012 | Wilkins | H04L 9/006 713/170 |
| 2012/0233674 | A1 * | 9/2012 | Gladstone et al. | 726/6 |
| 2012/0246463 | A1 * | 9/2012 | Shea | H04L 63/061 713/153 |
| 2012/0275601 | A1 * | 11/2012 | Matsuo | H04L 9/0844 380/282 |
| 2012/0290830 | A1 * | 11/2012 | Resch | H04L 9/3093 713/150 |
| 2013/0212392 | A1 * | 8/2013 | Nagarajan et al. | 713/171 |

(56) References Cited

U.S. PATENT DOCUMENTS

OTHER PUBLICATIONS

He et al., "Analysis of the 802.11i 4-Way Handshake", 2004.*
LAN/MAN Standards Committee, "IEEE Standard for Information technology—Telecommunications and information between system—Local and metropolitan area networks—Specific requirements", IEEE Computer Society, IEEE Std. 801.11-2007, Jun. 12, 2007, pp. 1-1183.
JP Office Action—Application No. 2012-104883 dated Feb. 26, 2016.

* cited by examiner

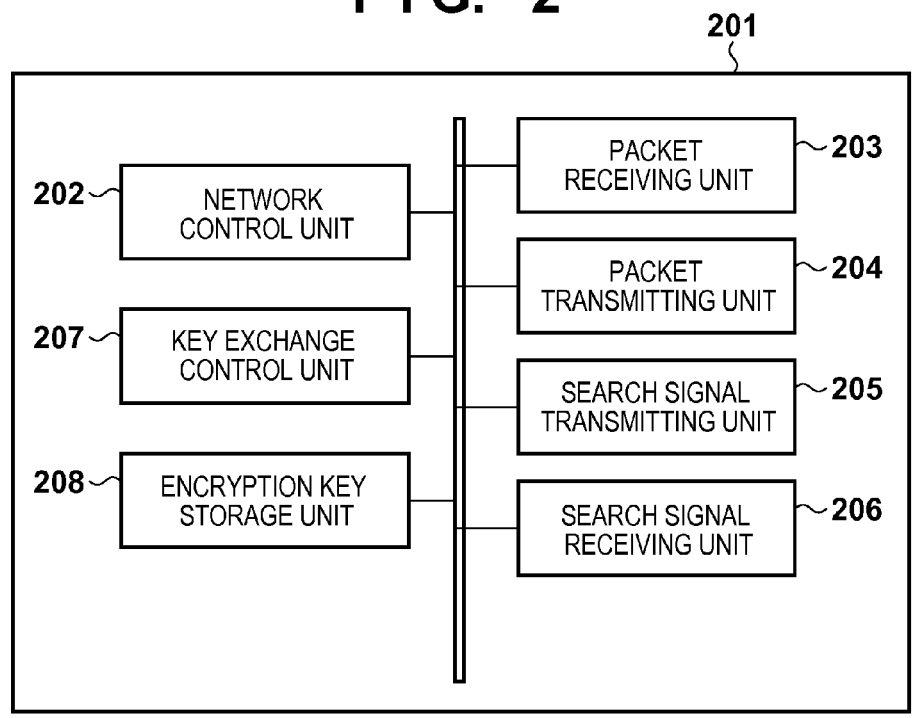
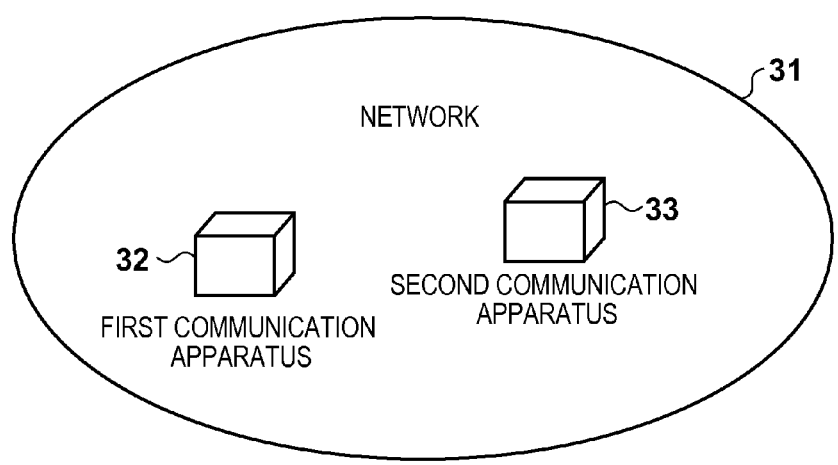

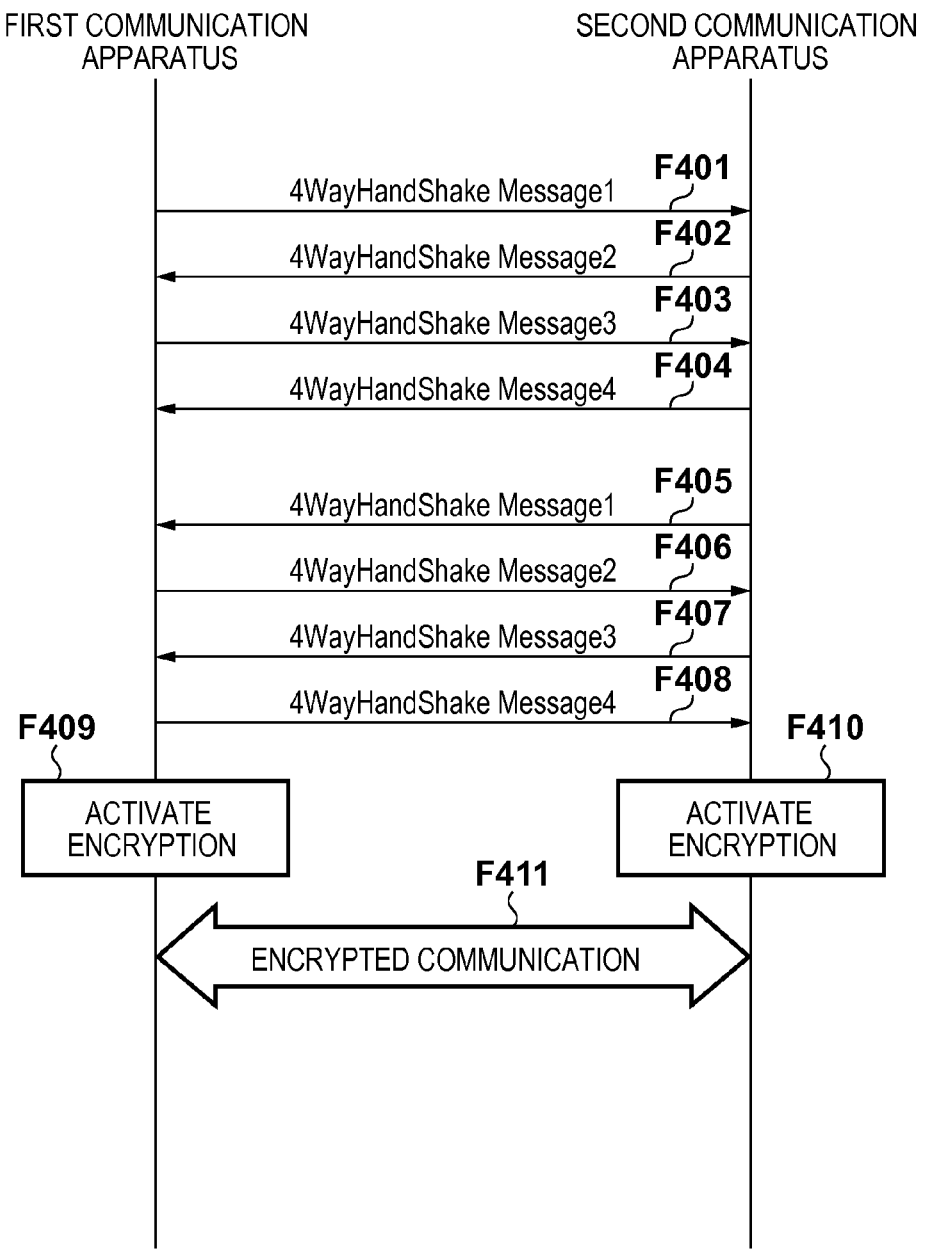

F I G. 5

| | MAC ADDRESS OF FIRST COMMUNICATION APPARATUS > MAC ADDRESS OF SECOND COMMUNICATION APPARATUS | MAC ADDRESS OF SECOND COMMUNICATION APPARATUS > MAC ADDRESS OF FIRST COMMUNICATION APPARATUS |
|---|---|---|
| CASE WHERE FIRST COMMUNICATION APPARATUS BECOMES AUTHENTICATOR FIRST | [PATTERN 1]<br>FIRST EXECUTION OF KEY EXCHANGE PROCESS<br>FIRST COMMUNICATION APPARATUS: AUTHENTICATOR<br>SECOND COMMUNICATION APPARATUS: SUPPLICANT<br>SECOND EXECUTION OF KEY EXCHANGE PROCESS<br>FIRST COMMUNICATION APPARATUS: SUPPLICANT<br>SECOND COMMUNICATION APPARATUS: AUTHENTICATOR<br><br>ADOPT UNICAST KEY (PTK) DERIVED FROM FIRST COMMUNICATION APPARATUS | [PATTERN 2]<br>FIRST EXECUTION OF KEY EXCHANGE PROCESS<br>FIRST COMMUNICATION APPARATUS: AUTHENTICATOR<br>SECOND COMMUNICATION APPARATUS: SUPPLICANT<br>SECOND EXECUTION OF KEY EXCHANGE PROCESS<br>FIRST COMMUNICATION APPARATUS: SUPPLICANT<br>SECOND COMMUNICATION APPARATUS: AUTHENTICATOR<br><br>ADOPT UNICAST KEY (PTK) DERIVED FROM SECOND COMMUNICATION APPARATUS |
| CASE WHERE SECOND COMMUNICATION APPARATUS BECOMES AUTHENTICATOR FIRST | [PATTERN 3]<br>FIRST EXECUTION OF KEY EXCHANGE PROCESS<br>FIRST COMMUNICATION APPARATUS: SUPPLICANT<br>SECOND COMMUNICATION APPARATUS: AUTHENTICATOR<br>SECOND EXECUTION OF KEY EXCHANGE PROCESS<br>FIRST COMMUNICATION APPARATUS: AUTHENTICATOR<br>SECOND COMMUNICATION APPARATUS: SUPPLICANT<br><br>ADOPT UNICAST KEY (PTK) DERIVED FROM FIRST COMMUNICATION APPARATUS | [PATTERN 4]<br>FIRST EXECUTION OF KEY EXCHANGE PROCESS<br>FIRST COMMUNICATION APPARATUS: SUPPLICANT<br>SECOND COMMUNICATION APPARATUS: AUTHENTICATOR<br>SECOND EXECUTION OF KEY EXCHANGE PROCESS<br>FIRST COMMUNICATION APPARATUS: AUTHENTICATOR<br>SECOND COMMUNICATION APPARATUS: SUPPLICANT<br><br>ADOPT UNICAST KEY (PTK) DERIVED FROM SECOND COMMUNICATION APPARATUS |

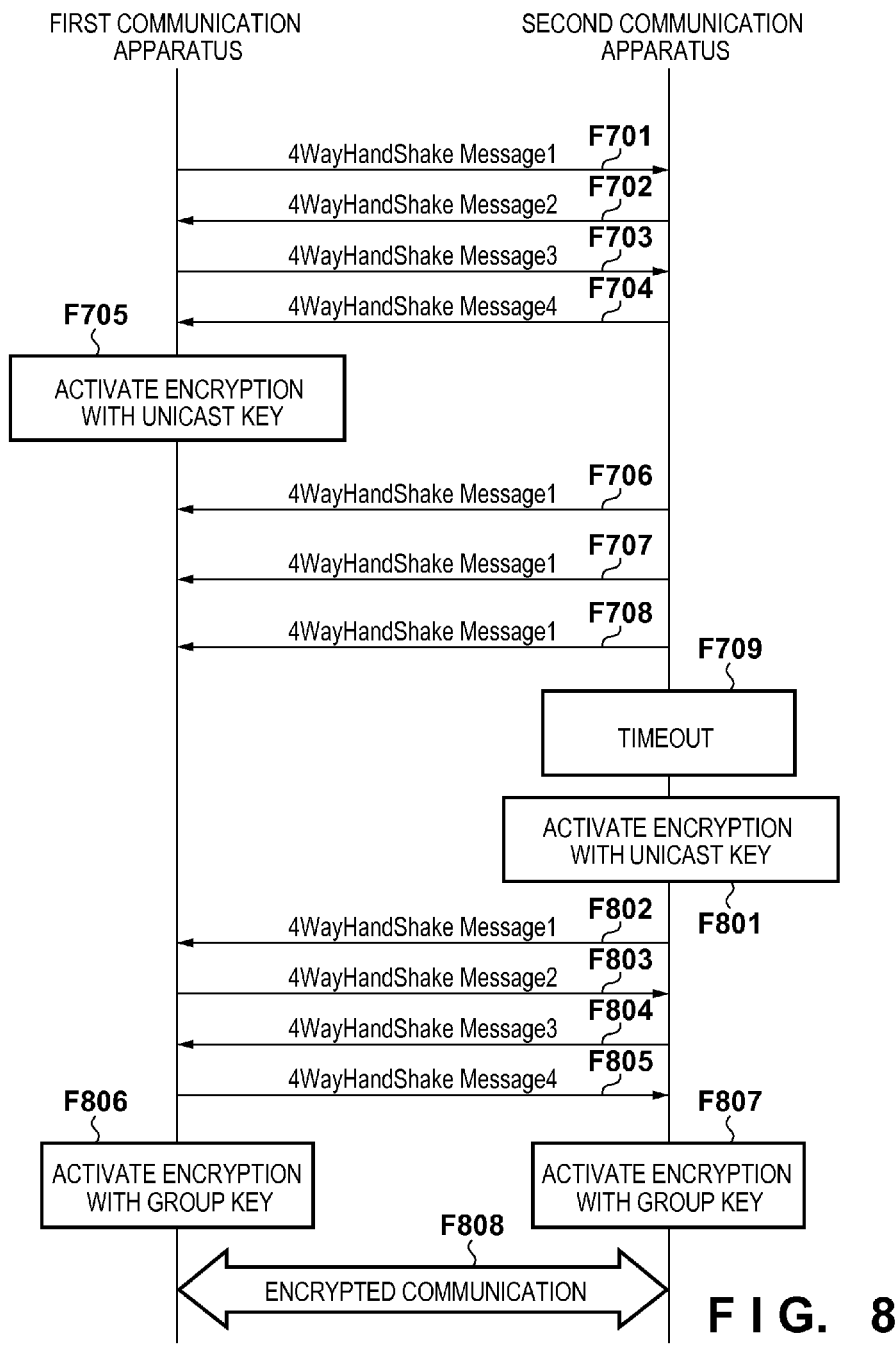
F I G. 8

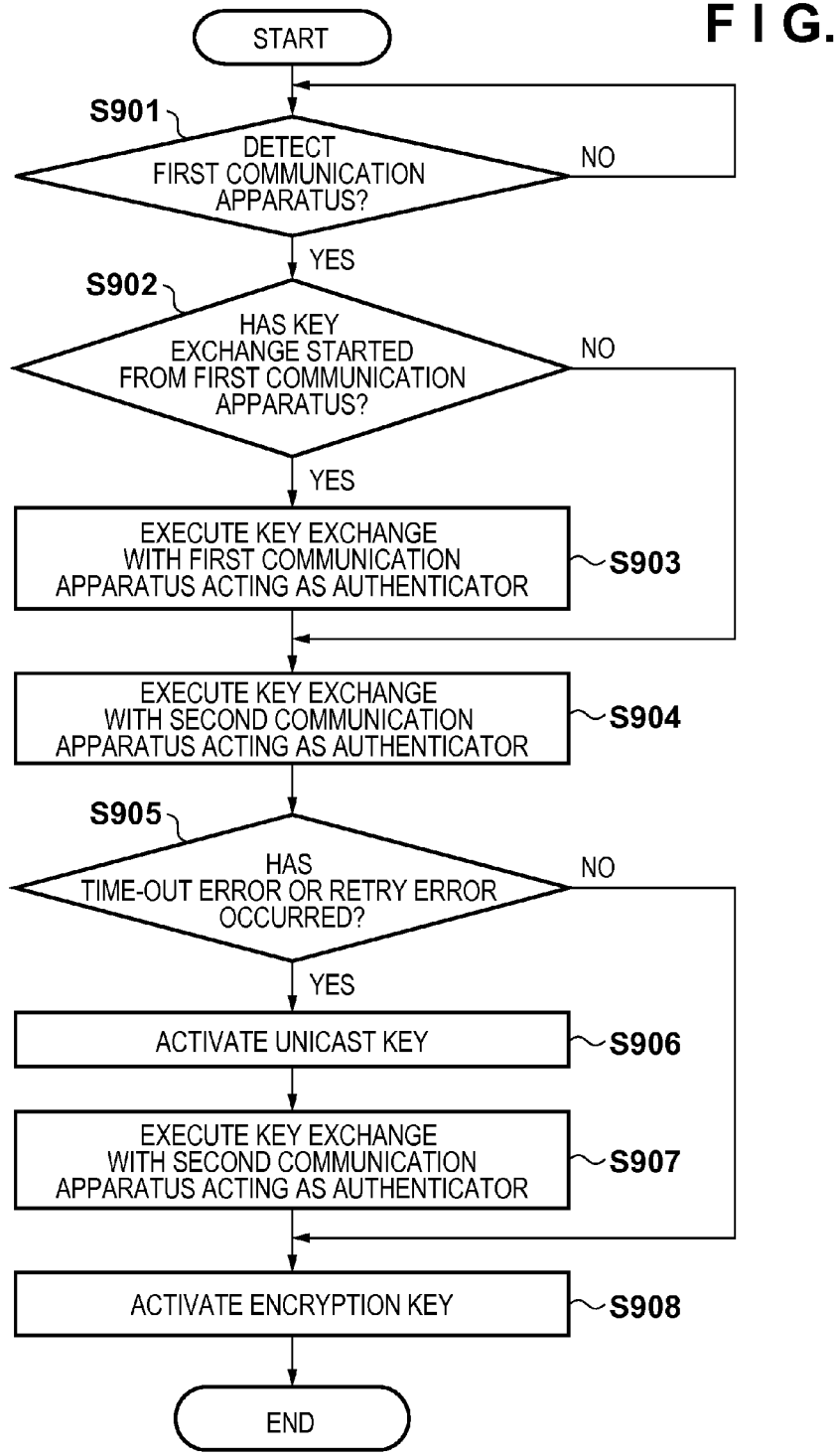
F I G. 9

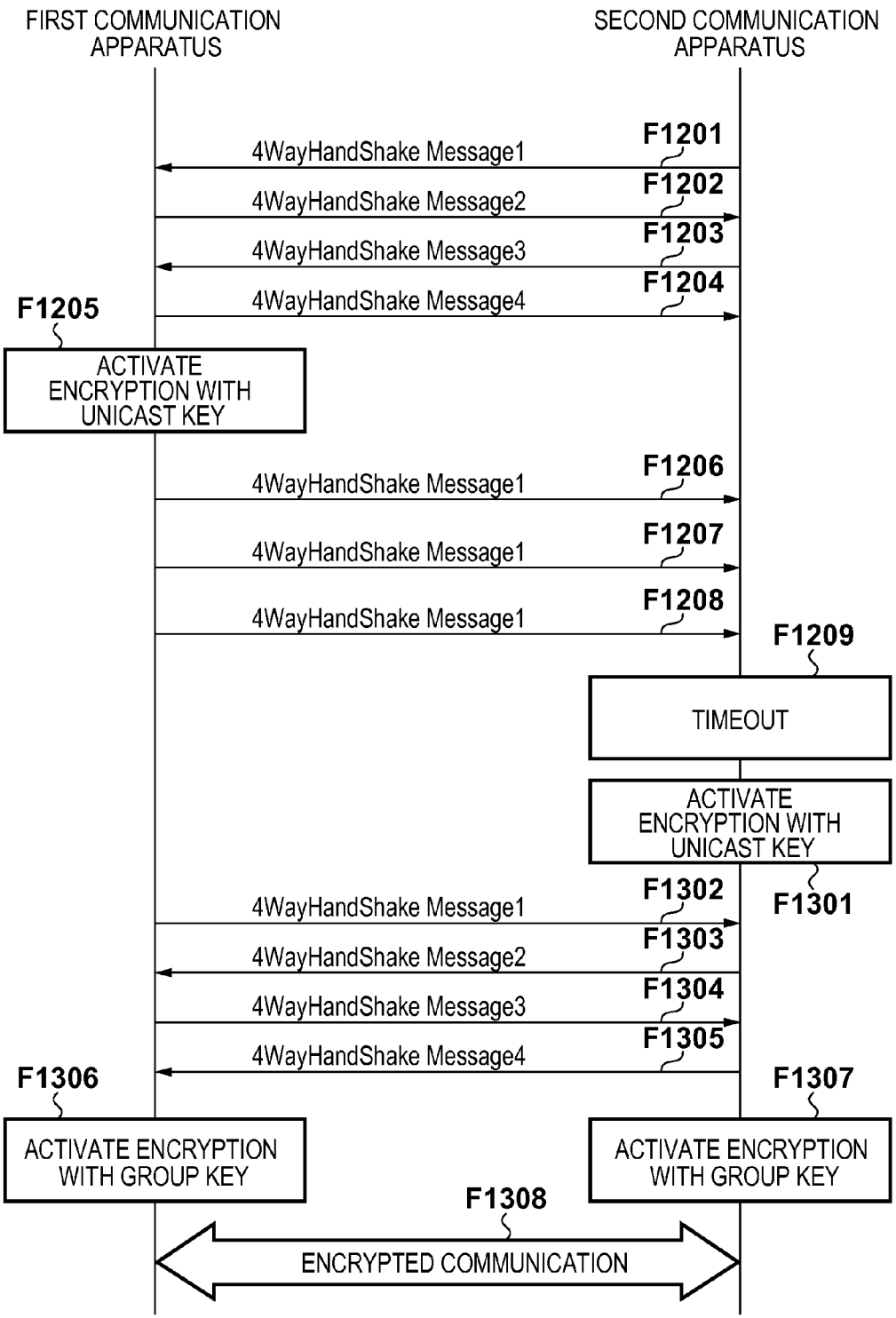

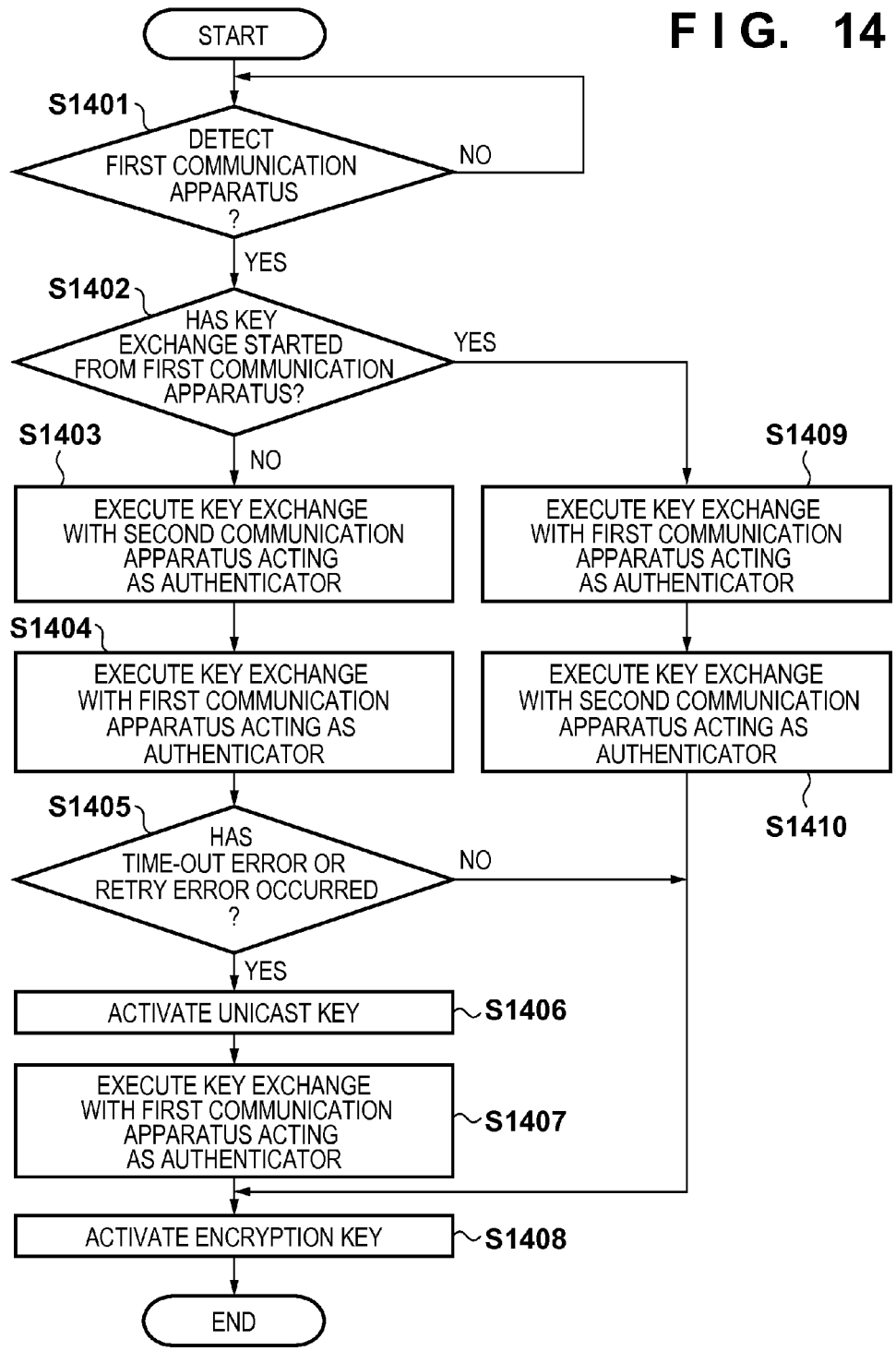

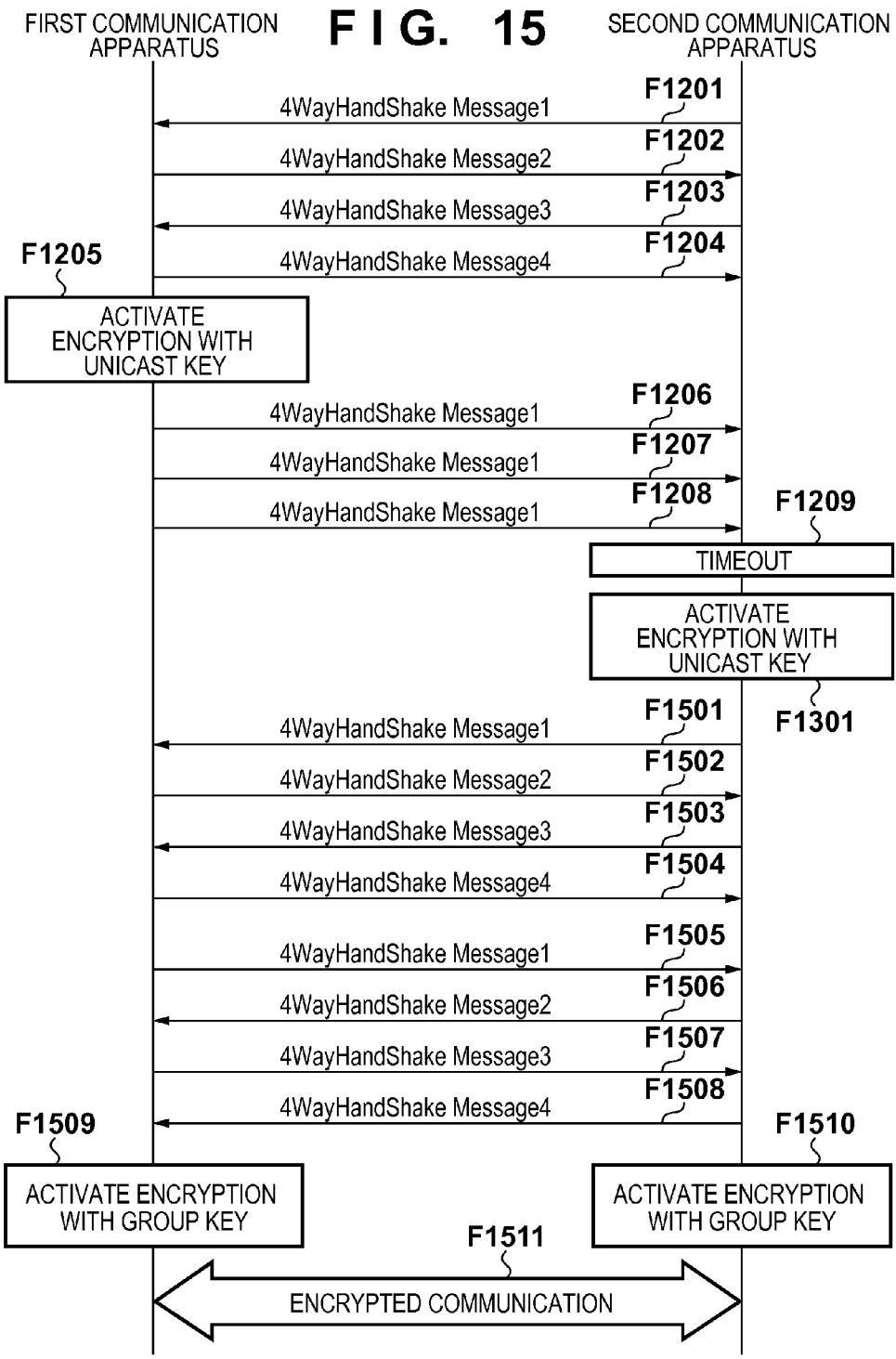

US 9,843,444 B2

COMMUNICATION APPARATUS, CONTROL METHOD, AND STORAGE MEDIUM

BACKGROUND OF THE INVENTION

Field of the Invention

The present invention relates to a technique for exchanging an encryption key between one communication device and a communication apparatus belonging to another party.

Description of the Related Art

Devices such as printers and mobile telephones equipped with a wireless LAN function have become increasingly popular in recent years. In order to protect the privacy of the users of such devices, a mechanism for encrypting data in wireless LANs has been standardized. A standard relating to a mechanism for sharing an encryption key between an authenticating apparatus (authenticator) and an authenticated apparatus (supplicant) is set forth in LAN/MAN Committee of the IEEE Computer Society, IEEE Std 802.11-2007 (Revision of IEEE Std 802.11-1999). Unicast key and group key exchange processing referred to as "four-way handshake" has been defined as processing executed between a device and a base station to which the device is connected, and a mechanism through which devices encrypt signals and communicate with each other via a base station has been established. Similarly, there are stipulations regarding four-way handshake in case of an adhoc mode in which devices directly communicate with each other without the intervention of a base station.

In the case of the adhoc mode, each of the devices performs the roles of both the authenticating apparatus and authenticated apparatus and bidirectional four-way handshake is executed twice. Since the group key is a key unique to the source of the transmission, four-way handshake is performed twice, changing the transmission source, in order to transmit the group key mutually between the authenticating apparatus and the authenticated apparatus. Further, with regard to the unicast encryption key when data is unicast, which encryption key of the encryption key of the authenticating apparatus and the encryption key of the authenticated apparatus is to be applied is decided depending upon whether or not the MAC addresses of the authenticating apparatus is larger than that of the authenticated apparatus.

However, with regard to processing for sharing an encryption key in the adhoc mode, the specifications set forth in LAN/MAN Committee of the IEEE Computer Society, IEEE Std 802.11-2007 (Revision of IEEE Std 802.11-1999) are such that it is conceivable that multiple forms of implementation will occur, depending upon the interpretation. As a result, a problem is that cases can occur in which devices having different forms of implementation cannot be mutually connected.

Japanese Patent Laid-Open No. 2008-099112 points out that although a unicast encryption key is determined by the third message (Message 3) of four-way handshake, whether the fourth message (Message 4) is to be sent using plain text or encrypted text is not decided. As a technique for solving this problem, Japanese Patent Laid-Open No. 2008-099112 describes a technique in which the supplicant sends Message 4 as plain text in a case where it has received Message 3 after transmission of the encrypted Message 4. However, Japanese Patent Laid-Open No. 2008-099112 is silent regarding adhoc networks and hence there is a need for measures to improve similar mutual connectivity with respect to adhoc networks.

The present invention has been devised in view of the foregoing problems and provides a technique that makes interconnection between communication apparatuses possible even in a case where different forms of implementation of security techniques are mixed together.

SUMMARY OF THE INVENTION

According to one aspect of the present invention, there is provided a communication apparatus for executing processing for sharing an encryption key between itself and another party's communication apparatus, wherein the communication apparatus executes the processing, respectively at least one time, as an authenticating apparatus and an authenticated apparatus, the communication apparatus comprising: a determination unit configured to determine which encryption key of an encryption key provided by the communication apparatus and an encryption key provided by the other party's communication apparatus is the encryption key used in common by the communication apparatus and the other party's communication apparatus; and a decision unit configured to decide, in accordance with result of the determination, which of the communication apparatus and other party's communication apparatus is to be made the authenticating apparatus first.

According to another aspect of the present invention, there is provided a communication apparatus for executing processing for sharing an encryption key between itself and another party's communication apparatus, wherein the communication apparatus executes the processing, respectively at least one time, as an authenticating apparatus and an authenticated apparatus, the communication apparatus comprising: a determination unit configured to determine, after the communication apparatus serving as either the authenticating apparatus or the authenticated apparatus has executed the processing for sharing the encryption key, whether an error has occurred in separate processing for sharing the encryption key; and an execution unit configured to perform, in a case where the determination unit has determined occurrence of an error, and using an encryption key used in common for encryption by the communication apparatus and the other party's communication apparatus, at least either of decryption of a signal, which relates to the processing for sharing the encryption key received from the other party's communication apparatus, and encryption of a signal, which relates to the processing for sharing the encryption key transmitted to the other party's communication apparatus, and to execute the processing for sharing the encryption key.

According to still another aspect of the present invention, there is provided a control method in a communication apparatus for executing processing for sharing an encryption key between itself and another party's communication apparatus, wherein the communication apparatus executes the processing, respectively at least one time, respectively at least one time, as an authenticating apparatus and an authenticated apparatus, the method comprising: determining which encryption key of an encryption key provided by the communication apparatus and an encryption key provided by the other party's communication apparatus is the encryption key used in common by the communication apparatus and the other party's communication apparatus; and deciding, in accordance with result of the determination, which of the communication apparatus and other party's communication apparatus is to be made the authenticating apparatus first.

According to yet another aspect of the present invention, there is provided a control method in a communication apparatus for executing processing for sharing an encryption key between itself and another party's communication apparatus, wherein the communication apparatus executes the processing, respectively at least one time, as an authenticating apparatus and an authenticated apparatus, the method comprising: determining, after the communication apparatus serving as either the authenticating apparatus or the authenticated apparatus has executed the processing for sharing the encryption key, whether an error has occurred after the start of, and before completion of, separate processing for sharing the encryption key; and performing, in a case where occurrence of the error has been determined, by using an encryption key used in common for encryption by the communication apparatus and the other party's communication apparatus, at least either of decryption of a signal, which relates to the processing for sharing the encryption key received from the other party's communication apparatus, and encryption of a signal, which relates to the processing for sharing the encryption key transmitted to the other party's communication apparatus, and executing the processing for sharing the encryption key.

Further features of the present invention will become apparent from the following description of exemplary embodiments (with reference to the attached drawings).

BRIEF DESCRIPTION OF THE DRAWINGS

FIG. 2 is a block diagram illustrating an example of software functions of a communication apparatus;

FIG. 3 is a diagram illustrating an example of a network configuration;

FIG. 4 is a sequence diagram illustrating operation of key exchange processing in the adhoc mode;

FIG. 5 is a table illustrating combinations of key exchange processes in the adhoc mode;

FIG. 8 is a sequence diagram illustrating an example of operation of key exchange processing using a method according to a second embodiment;

FIG. 9 is a flowchart illustrating an example of operation of a second communication apparatus in the second embodiment;

FIG. 13 is a sequence diagram illustrating an example of operation of key exchange processing using a method according to a third embodiment;

FIG. 14 is a flowchart illustrating an example of operation of a second communication apparatus in a third embodiment; and FIG. 15 is a sequence diagram illustrating one more example of operation of key exchange processing using a method according to the third embodiment.

DESCRIPTION OF THE EMBODIMENTS

An exemplary embodiment(s) of the present invention will now be described in detail with reference to the drawings. It should be noted that the relative arrangement of the components, the numerical expressions and numerical values set forth in these embodiments do not limit the scope of the present invention unless it is specifically stated otherwise.

Although the description that follows relates to an example in which use is made of a wireless LAN system conforming to the IEEE 802.11 series, the present invention is not limited to a wireless LAN system conforming to the IEEE 802.11 series and can be applied to other communication techniques as well.

First Embodiment (Hardware Configuration of Communication Apparatus)

Figure 1:
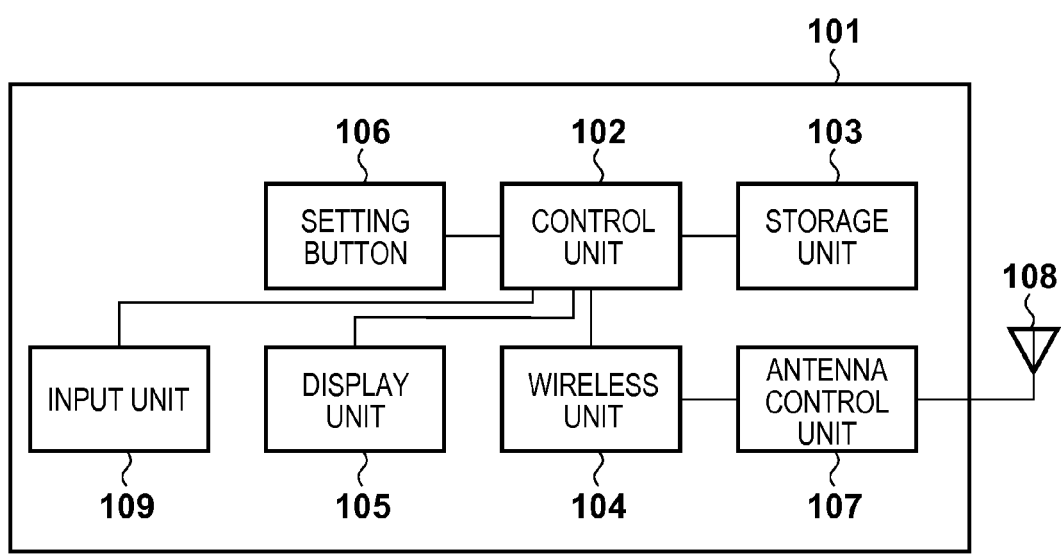
FIG. 1 is a block diagram illustrating an example of the configuration of a communication apparatus.

FIG. 1 is a block diagram illustrating an example of the configuration of a communication apparatus according to this embodiment. A communication apparatus 101 has, for example, a control unit 102, a storage unit 103, a wireless unit 104, a display unit 105, a setting button 106, an antenna control unit 107, an antenna 108 and an input unit 109.

The control unit 102 runs a control program stored in the storage unit 103 and controls the communication apparatus 101. The control unit 102 further executes control for setting communication parameters between this communication apparatus and another communication apparatus. The storage unit 103 stores the control program executed by the control unit 102 and various information such as the communication parameters. Various operations described below are carried out by, for example, having the control unit 102 execute the control program stored in the storage unit 103.

The wireless unit 104 is a functional unit for performing wireless LAN communication compliant with the IEEE 802.11 series. The display unit 105 has a function that makes possible output of information capable of being perceived visually, as in the manner of an LCD (liquid crystal display) or LED (light-emitting diode), or output of audio as in the manner of a speaker or the like. The setting button 106 is a hardware button that applies a trigger which starts processing for setting communication parameters. When the setting button 106 is operated, the control unit 102 detects this operation and starts processing, which includes processing described later, for automatically setting communication parameters. The antenna control unit 107 controls the antenna 108 and executes at least one of transmission and reception of a wireless signal via the antenna 108. The input unit 109, for example a keyboard and mouse or the like, is for allowing a user to make various inputs. Communication with another communication apparatus, described later, is implemented via the wireless unit 104, antenna control unit 107 and antenna 108 by wireless LAN communication compliant with the IEEE 802.11 series.

(Functional Configuration of Communication Apparatus)

FIG. 2 is a block diagram illustrating an example of software functions for executing encryption key exchange processing, described later. A communication apparatus 201 has, for example, the functions of a network control unit 202, a packet receiving unit 203, a packet transmitting unit 204, a search signal transmitting unit 205, a search signal receiving unit 206, a key exchange control unit 207 and an encryption key storage unit 208.

The network control unit 202 controls the network connection and executes processing such as processing for connecting to a wireless LAN adhoc network. The packet receiving unit 203 receives packets relating to a variety of communications. The packet receiving unit 203 receives a beacon (broadcast signal). The packet transmitting unit 204 transmits packets relating to various communications. Transmission of the beacon signal is performed by the packet transmitting unit 204. It should be noted that various information concerning the device at the transmission source is appended to the beacon. It should be noted that a transmitting unit and a receiving unit for sending and receiving signals other than packets can be substituted for respective ones of the packet receiving unit 203 and packet transmitting unit 204.

The search signal transmitting unit 205 controls the transmission of a device search signal such as a probe request. A probe request signal is a network search signal used to search for a desired network. The search signal transmitting unit 205 transmits the probe request as well as a probe response, which is a signal sent in response to a received probe request. The search signal receiving unit 206 controls the receipt of a device search signal such as a probe request from another communication apparatus. The search signal receiving unit 206 receives a probe request as well as a probe response. Furthermore, various information relating to the communication apparatus that transmits the device search signal and its response signal is appended to these signals.

The key exchange control unit 207 controls key exchange using WPA and key setting using WPA-None. The encryption key storage unit 208 stores encryption keys of a predetermined number for every communication apparatus, and processing for encrypting and decrypting communication packets is executed using the stored encryption key. For every other communicating party, the encryption key storage unit 208 holds a session key and group key shared mainly in WPA key exchange processing.

It should be noted that all of the function blocks are interrelated in terms of software or hardware. Further, the above-described configuration of function blocks is one example. One of the above-mentioned function blocks may be implemented by a plurality of function blocks, and a plurality of the above-mentioned function blocks may be implemented by one function block.

(Network Configuration)

FIG. 3 is a diagram illustrating an example of a network configuration according to this embodiment. An adhoc network 31 is constituted by a first communication apparatus 32 and a second communication apparatus 33. The communication apparatuses in the adhoc network 31 communicate directly without the intervention of a base station. Here it is assumed that the first communication apparatus and second communication apparatus have the hardware configuration of FIG. 1 and the software configuration of FIG. 2. It should be noted that in a case where encrypted communication using WPA is performed between the first communication apparatus and second communication apparatus, it is necessary to set a unicast key (PTK) and a group key (GTK) between the first communication apparatus and the second communication apparatus.

(Operation of Key Exchange Process)

FIG. 4 is a sequence diagram illustrating an example of key exchange processing in the adhoc mode. The first communication apparatus and the second communication apparatus perform key exchange (F401 to F404) with these apparatuses serving as an authenticator (authenticating apparatus) and as a supplicant (authenticated apparatus), respectively. Key exchange processing is share processing for sharing an encryption key. For the details of this processing, refer to LAN/MAN Committee of the IEEE Computer Society, IEEE Std 802.11-2007 (Revision of IEEE Std 802.11-1999). Here the unicast key (PTK) is shared between the first communication apparatus and the second communication apparatus, and the group key of the first communication apparatus is transmitted to the second communication apparatus using this unicast key.

Thereafter, the roles of the first communication apparatus and second communication apparatus are reversed and key exchange is performed (F405 to F408) with these communication apparatuses serving as the supplicant and as the authenticator, respectively. Here the unicast key (PTK) is shared between the first communication apparatus and the second communication apparatus, and the group key of the second communication apparatus is transmitted to the first communication apparatus using this unicast key.

Following the completion of these two key exchanges, the first communication apparatus and the second communication apparatus activate their encryption key storage units 208 using the unicast key and the two exchanged group keys (F409, F410). It should be noted that as the unicast key, the key that was shared when whichever of the first or second communication apparatus having the larger MAC address served as the authenticator. Owing to activation of the encryption circuitry by both the first and second communication apparatuses, encrypted communication between the first and second communication apparatuses becomes possible (F411). In the description above, a case where the first communication apparatus becomes the authenticator in the first key exchange is described. However, the second communication apparatus may just as well be the authenticator in the first key exchange.

It should be noted that in a case where three or more communication apparatuses exist, usually any pair of these communication apparatuses is selected and a key exchange is performed one time each by two communication apparatuses with one serving as the authenticating apparatus and one serving as the authenticated apparatus and vice versa. However, it may be arranged so that a key exchange is performed at one time with regard to three or more communication apparatuses. In such case, for example, a communication apparatus performs a key exchange as an authenticating apparatus just one time and performs a key exchange as an authenticated communication apparatus during the time that the other communication apparatus is acting as the authenticating communication apparatus. Thus, the communication apparatuses perform key exchange, respectively at least one time, as an authenticating apparatus and as an authenticated apparatus.

When which of the MAC addresses of the first and second communication apparatuses is larger and the matter as to which will be the authenticator of the first key exchange are considered, four combinations indicated as Patterns 1 to 4 are conceivable as shown in FIG. 5. In Patterns 1 and 4 of FIG. 5, the specifications are such that it is possible to decide a unicast key (PSK) in the first key exchange. Depending upon the implementation, therefore, a case where the second key exchange fails will occur as a result of only either one of the first and second communication apparatuses activating encryption-related processing in the second key exchange. That is, the communication apparatus that has activated encryption-related processing will judge that the signal from the communication apparatus of the other communicating party has undergone encryption and will apply decryption processing to this signal. However, since the signal from the communication apparatus of the other communicating party has been sent as plain text, the signal will no longer be capable of being interpreted by performing decryption processing. Similarly, since a signal that has undergone encryption cannot be interpreted by the communication apparatus of the other communicating party, the encryption key exchange process performed the second time will fail as a result.

In this embodiment, therefore, control is carried out which causes the communication apparatuses to execute the processing of Patterns 2 and 3, namely control in which the second key exchange is always performed in plain text by not finalizing the encryption key by just the first key exchange.

Figure 6:
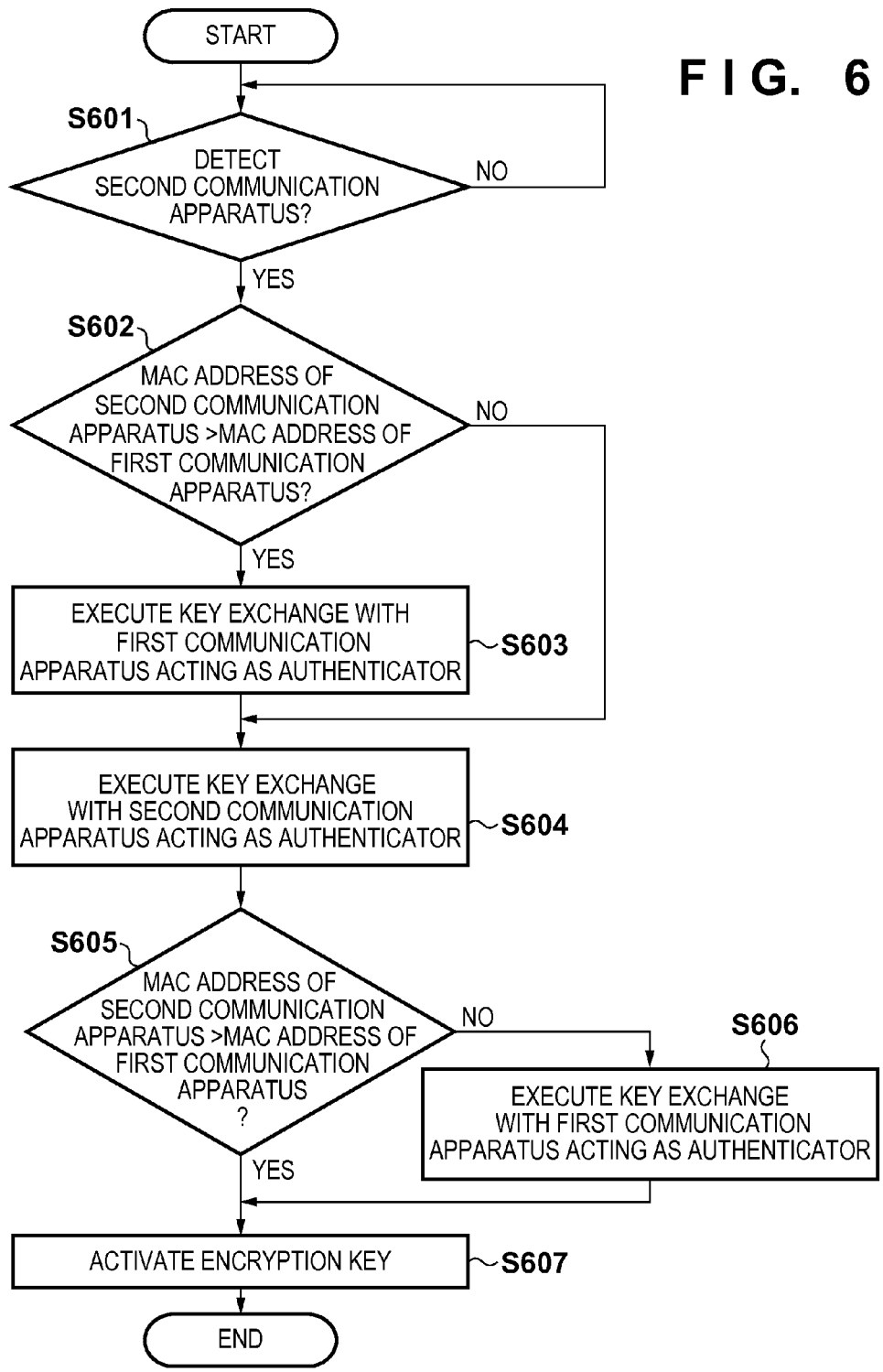
FIG. 6 is a flowchart illustrating an example of operation of a first communication apparatus in a first embodiment.

FIG. 6 is a flowchart illustrating such a control operation. Here the operation shown in FIG. 6 will be described as being executed by the first communication apparatus. However, the second communication apparatus may execute similar processing. The first communication apparatus first detects the second communication apparatus (step S601). If the second communication apparatus is not detected ("NO" at step S601), the first communication apparatus continues waiting for a fixed period of time until the second communication apparatus is detected. If the second communication apparatus is detected ("YES" at step S601), then the first communication apparatus compares the values of its own MAC address and the MAC address of the second communication apparatus (step S602).

If the MAC address of the second communication apparatus is larger than that of the first communication apparatus ("YES" at step S602), the first communication apparatus executes key exchange processing with its own role being made that of the authenticator (step S603). It should be noted that if the second communication apparatus tries to execute key exchange processing in the role of the authenticator, this packet is ignored. After the first communication apparatus executes key exchange processing as the authenticator, the next time the first communication apparatus executes key exchange processing with the second communication apparatus serving as the authenticator (step S604).

On the other hand, if the MAC address of the second communication apparatus is larger than that of the first communication apparatus ("NO" at step S602), the first communication apparatus executes key exchange processing with the second communication apparatus serving as the authenticator (step S604). It should be noted that after the processing of step S602, the first communication apparatus waits to execute key exchange processing with the second communication apparatus serving as the authenticator. Then, following completion of the key exchange processing at step S604, the first communication apparatus compares the values of the MAC addresses of the first and second communication apparatuses again (step S605).

If the MAC address of the second communication apparatus is larger, the first communication apparatus activates encryption-related processing in the encryption key storage unit 208 and terminates processing (step S607) because exchange has already been completed by the key exchange processing of step S604. On the other hand, if the MAC address of the first communication apparatus is larger than that of the second communication apparatus, the first communication apparatus executes key exchange processing with itself serving as the authenticator (step S606). It should be noted that at step S605, rather than comparing the MAC addresses, a determination may be made as to whether key exchange processing has already been executed two times.

Thus, in accordance with this embodiment, the order in which each of the communication apparatuses serves as the authenticator in key exchange processing is decided in such a manner that, in the first execution of key exchange processing, key exchange processing is executed with the communication apparatus having the smaller MAC address serving as the authenticator. For example, if the MAC address of the first communication apparatus is smaller than that of the second communication apparatus, then it is decided that the first communication apparatus will operate as the authenticator in the first key exchange processing. As a result, it is possible to prevent failure of key exchange processing, which failure is ascribable to only either one of the first and second communication apparatuses activating encryption-related processing in the second execution of key exchange processing, because PTK is not decided in the first execution of key exchange processing.

In this embodiment, it is determined which of the MAC addresses is larger and the communication apparatus that will serve as the authenticator first is decided based upon the result of the determination. However, this does not impose any limitation. For example, it may be determined which of unicast keys provided by communication apparatuses that perform a key exchange is a unicast key to be used in common for encryption by these communication apparatuses. An order may be decided in such a manner that in accordance with the result of this determination, the communication apparatus that provides the unicast key used in common for encryption by these communication apparatuses will serve as the authenticator in final execution of key exchange processing. For example, it may be arranged so that in a case where a unicast key exchanged when the apparatus having the latest date of manufacture is the authenticator is the unicast key that is to be used, the dates of manufacture are compared. In accordance with this arrangement, the unicast key that will be used will be exchanged in the final execution of key exchange processing. As a result, it is possible to prevent encrypted text from being used in key exchange processing up until the final execution of key exchange processing.

It should be noted that an encryption key exchange among a plurality (three or more) communication apparatuses may be performed for every two of the communication apparatuses or may be performed at one time among the plurality of communication apparatuses. Processing according to this embodiment can be applied even in a case where an encryption key exchange is performed at one time among a plurality of (three or more) communication apparatuses. That is, it is determined which of keys provided by a plurality of communication apparatuses is an encryption key to be used by these communication apparatuses, and it is arranged so that the communication apparatus that provides this key will function finally as the authenticating apparatus. As a result, it is possible to eliminate a problem wherein, in key exchange processing performed a plurality of times, some of the communication apparatuses use encrypted text and the other communication apparatuses cannot interpret this text.

Second Embodiment

In a second embodiment, interconnectivity is improved by controlling whether or not encryption is performed and not by the order of key exchange processing. The hardware configuration and software function configuration of communication apparatuses and the network configuration and the like in this embodiment are similar to those of the first embodiment. In the description below, it is assumed that the implementation is such that when the first communication apparatus acquires a unicast key (PTK) that is to be used in the first execution of key exchange processing, the first communication apparatus activates processing relating to encryption according to this unicast key even though this is before the second execution of key exchange processing. Further, unless stated otherwise, it is assumed that the implementation is such that even if the second communication apparatus has acquired a unicast key to be used in the first execution of key exchange processing, processing relating to encryption according to this unicast key is activated after the second execution of key exchange processing.

First, in order to recognize the problem, the case of Pattern 1 in FIG. 5 will be described with reference to FIG. 7. In Pattern 1, the unicast key exchanged by key exchange processing in a case where the first communication apparatus is the authenticator is one that is to be used by the first and second communication apparatuses.

Figure 7:
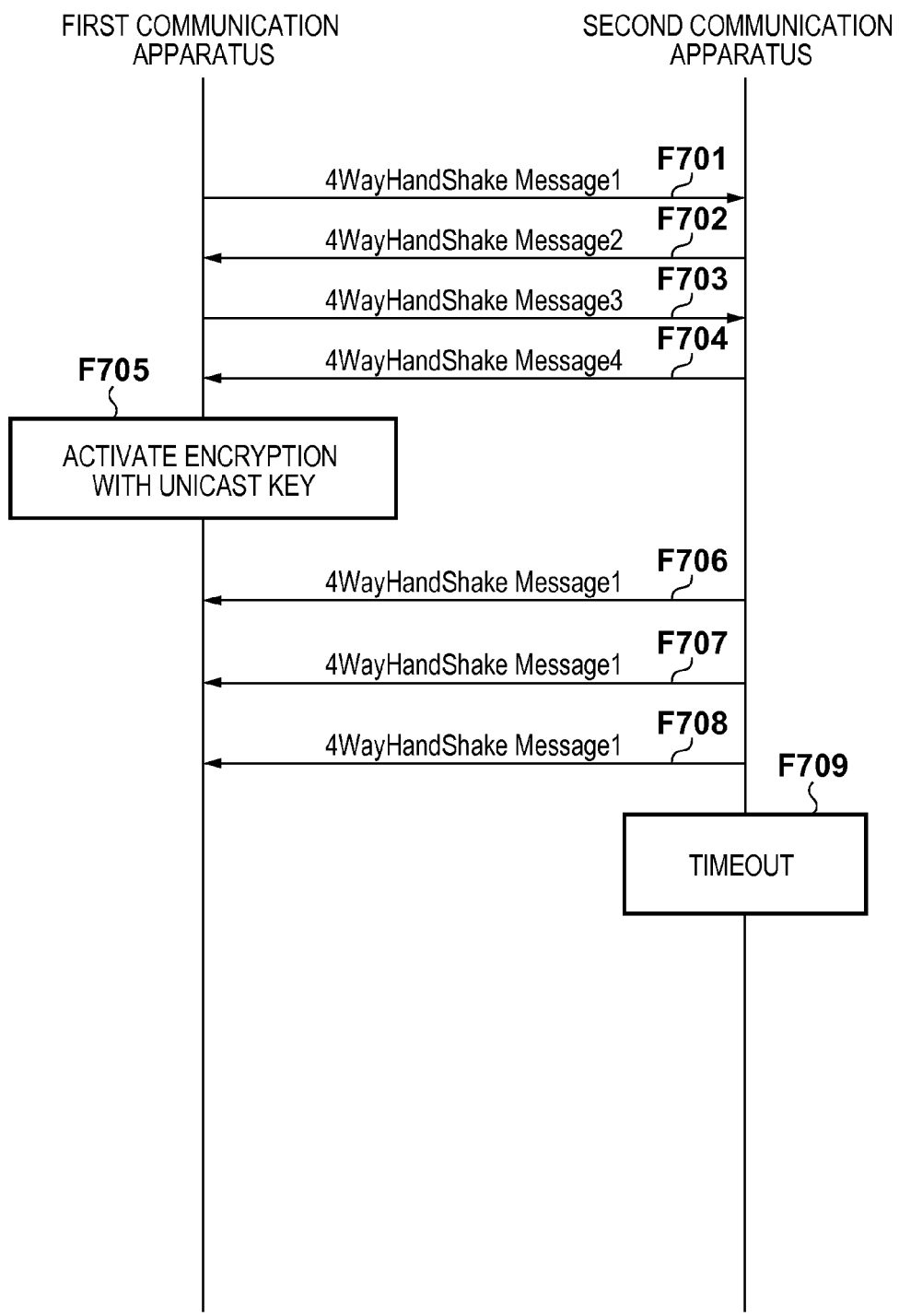
FIG. 7 is a sequence diagram illustrating an example of operation of key exchange processing in a case where only one communication apparatus activates a process relating to encryption.

In the sequence diagram of FIG. 7, first the first communication apparatus and the second communication apparatus perform key exchange (F701 to F704) with these apparatuses serving as an authenticator and as a supplicant, respectively. The unicast key (PTK) is shared between the first communication apparatus and the second communication apparatus, and the group key of the first communication apparatus is transmitted to the second communication apparatus using this unicast key. As mentioned earlier, the first communication apparatus, upon acquiring the unicast key to be used in the first execution of key exchange processing, activates processing relating to encryption (F705) according to this unicast key even though this is before the second execution of key exchange processing.

After the first communication apparatus activates the encryption-related processing, the roles of the first communication apparatus and second communication apparatus are reversed and key exchange starts with these communication apparatuses serving as the supplicant and as the authenticator, respectively. As mentioned earlier, even though the unicast key exchanged in the period of time during which the first communication apparatus is the authenticator is the unicast key to be used, the second communication apparatus will not activate encryption-related processing until the second execution of key exchange processing is completed. Accordingly, since the second communication apparatus does not activate encryption-related processing after the first key exchange, the second communication apparatus transmits a key exchange packet as plain text (F706). However, since the first communication apparatus has activated encryption-related processing, it cannot recognize the plain-text packet from the second communication apparatus. Consequently, the first communication apparatus discards the plain-text key exchange packet from the second communication apparatus and does not send back a response.

On the other hand, since it does not receive a response, the second communication apparatus retransmits the key exchange packet (F707, F708). The second communication apparatus performs retransmission of key exchange packets a predetermined number of times, for example, but eventually a timeout occurs (F709). As a result, a problem which arises is that encrypted communication according to WPA cannot be established between the first and second communication apparatuses.

Accordingly, as illustrated in FIG. 8, the second communication apparatus of this embodiment activates encryption-related processing (F801) with regard to the unicast key, in a manner similar to that of the first communication apparatus, on or after the moment at which the timeout occurs. Then, after encryption-related processing is activated in the second communication apparatus, this communication apparatus encrypts and transmits a key exchange packet (F802) similar to that retransmitted at F706 to F708. In this case, since the first communication apparatus that has activated encryption-related processing can interpret the key exchange packet, key exchange processing continues (F803 to F805) without this packet being discarded. Following completion of key exchange, the first and second communication apparatuses activate encryption-related processing (F806, F807) that is based upon the group key. As a result, since encryption-related processing is activated in both the first and second communication apparatuses, encrypted communication becomes possible (F808).

Reference will be had to FIG. 9 to describe the processing executed by the second communication apparatus in order to implement the sequence diagram shown in FIG. 8. First, the second communication apparatus detects the first communication apparatus (step S901). If the first communication apparatus is not detected ("NO" at step S901), the second communication apparatus continues waiting for a fixed period of time until the first communication apparatus is detected. If the first communication apparatus is detected ("YES" at step S901), then the second communication apparatus determines whether key exchange has started from the first communication apparatus (step S902). Here the second communication apparatus determines whether Message 1 of the four-way handshake, which corresponds to F701 in FIG. 8, has been received.

If a key exchange has not started from the first communication apparatus ("NO" at step S902), then a key exchange processing is executed with the second communication apparatus serving as the authenticator (step S904). In this case, since the first communication apparatus has not exchanged the unicast key in the role of the authenticator, the first and second communication apparatuses do not activate encryption-related processing based upon the unicast key until the second key exchange is performed. Key exchange processing (not shown) is subsequently executed in plain text with the first communication apparatus serving as the authenticator, and the key exchange is completed.

In a case where the second communication apparatus determines that the key exchange has started from the first communication apparatus ("YES" at step S902), then key exchange processing is executed with the first communication apparatus serving as the authenticator (step S903). At this time the second communication apparatus adopts the role of the supplicant as its own role. After the completion of key exchange processing (step S903), the first and second communication apparatuses change their roles and begin key exchange processing (step S904). That is, key exchange processing starts with the second communication apparatus serving as the authenticator, and the second communication apparatus transmits Message 1 of the four-way handshake to the first communication apparatus. The second communication apparatus ascertains (step S905) whether a timeout error, which is ascribable to timing out of a predetermined timer after the start of, and before the end of, a single execution of key exchange processing at step S904, or a retry error, which is ascribable to completion of retransmission a predetermined number of times, has occurred. If an error has not occurred ("NO" at step S905), the second communication apparatus activates the encryption key (step S908) and terminates processing.

On the other hand, in the sequence diagrams of FIGS. 7 and 8, the first communication apparatus activates processing relating to unicast encryption but the second communication apparatus does not execute unicast encryption. Consequently, Message 1 of the four-way handshake transmitted by the second communication apparatus at step S904 is plain text. However, since plain text cannot be recognized in the first communication apparatus, the second communication apparatus does not receive a response and at least either of the timeout error or retry error occurs. If the second communication apparatus detects at least either of the timeout error or retry error ("YES" at step S905), then the second communication apparatus activates encryption-related processing (step S906) that is based upon the unicast key obtained by the key exchange processing of step S903. Thereafter, the second communication apparatus itself serves as the authenticator and executes key exchange processing (step S907) in a state in which encryption-related processing based upon the unicast key has been activated. Since the first communication apparatus can now comprehend the message from the second communication apparatus, processing from the key exchange processing of messages that follow Message 1 can proceed. This is followed by activation of the encryption key and termination of processing (step S908).

In this embodiment, if, after completion of the first execution of key exchange processing, the second execution of key exchange processing is tried using plain text and an error occurs, i.e., if an error occurs before all key exchange processing is completed, then encryption-related processing based upon the unicast key is activated and key exchange processing is executed again. As a result, it is possible to accomplish key exchange processing a plurality of times (two times), which is stipulated in terms of the specifications, without being dependent upon the timing at which encoding is started, and it is possible to execute encrypted communication between the first communication apparatus and the second communication apparatus.

Figure 10:
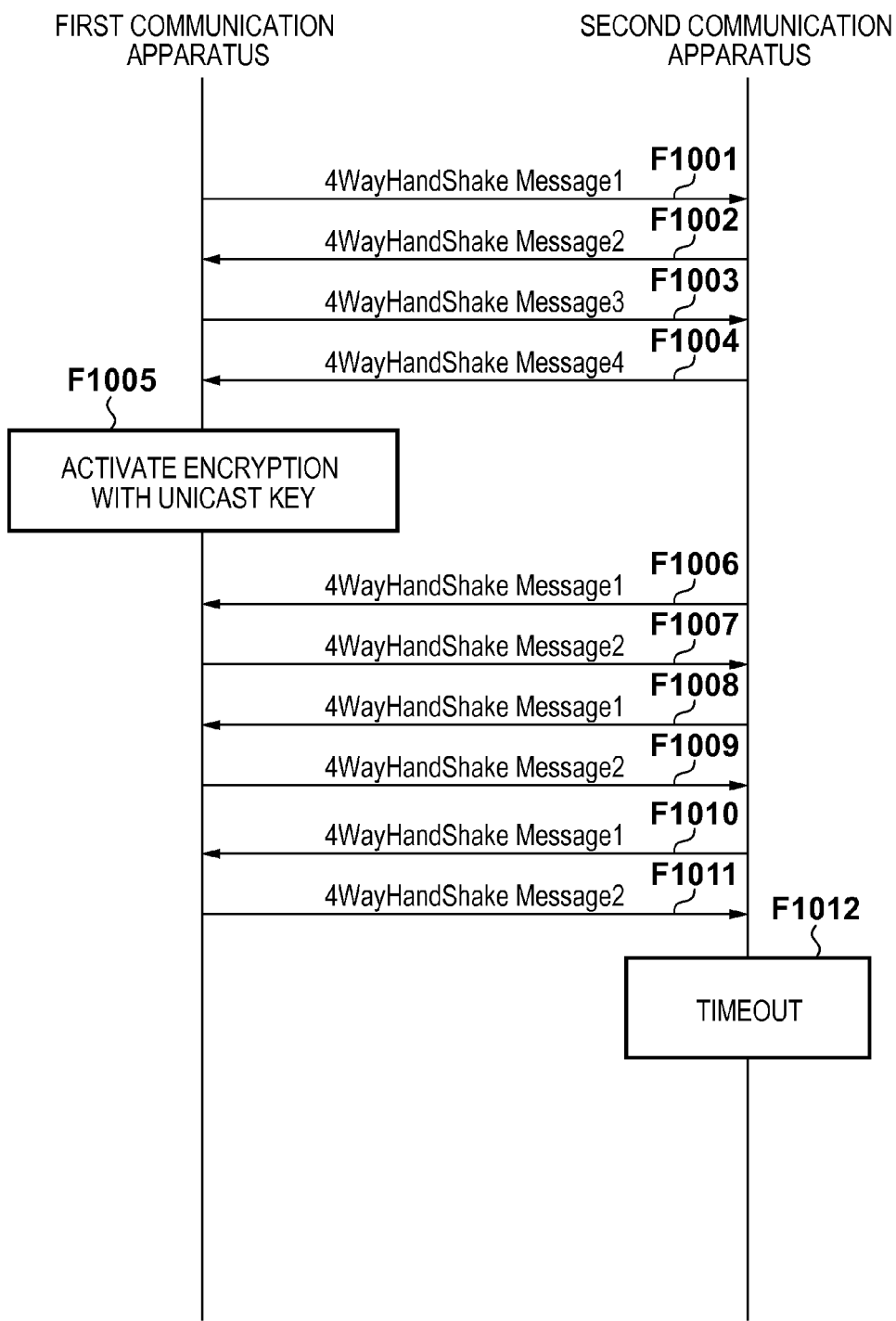
FIG. 10 is a sequence diagram illustrating one more example of operation of key exchange processing in a case where only one communication apparatus activates a process relating to encryption.

In the description above, an arrangement for controlling whether or not encryption is performed is described with regard to a case where initially the first communication apparatus executes key exchange processing as the authenticator. The foregoing description was rendered on the premise that the communication apparatus that has activated encryption-related processing cannot interpret a plain-text packet. However, there exists a communication apparatus that is capable of interpreting an EAPoL packet, which is used in key exchange protocols, even in plain text even if encryption-related processing has been activated. Events that occur in such case will be described with reference to FIG. 10.

First, the first communication apparatus and the second communication apparatus perform key exchange (F1001 to F1004) with these apparatuses serving as the authenticator and supplicant, respectively. The unicast key (PTK) is shared between the first communication apparatus and the second communication apparatus, and the group key of the first communication apparatus is transmitted to the second communication apparatus using this unicast key. Since the unicast key is finalized at this stage, the first communication apparatus activates encryption-related processing (F1005).

After the first communication apparatus activates the encryption-related processing, the roles of the first communication apparatus and second communication apparatus are reversed and key exchange starts with these communication apparatuses serving as the supplicant and as the authenticator, respectively. Since the second communication apparatus does not activate encryption-related processing after the first key exchange, it transmits a key exchange packet using plain text (F1006). Since the first communication apparatus is capable of recognizing plain text only in an EAPoL packet used in key exchange protocols, it transmits a key-exchange response packet to the second communication apparatus (F1007). However, the response packet transmitted by the first communication apparatus at F1007 has been encrypted because the first communication apparatus has activated encryption-related processing.

Since the second communication apparatus has not activated encryption-related processing, it does not recognize the packet received from the first communication apparatus, discards this packet and retransmits a key exchange packet (F1008). The second communication apparatus performs retransmission of the key exchange packet a predetermined number of times but eventually a timeout occurs (F1012). As a result, encrypted communication according to WPA cannot be established between the first and second communication apparatuses.

Figure 11:
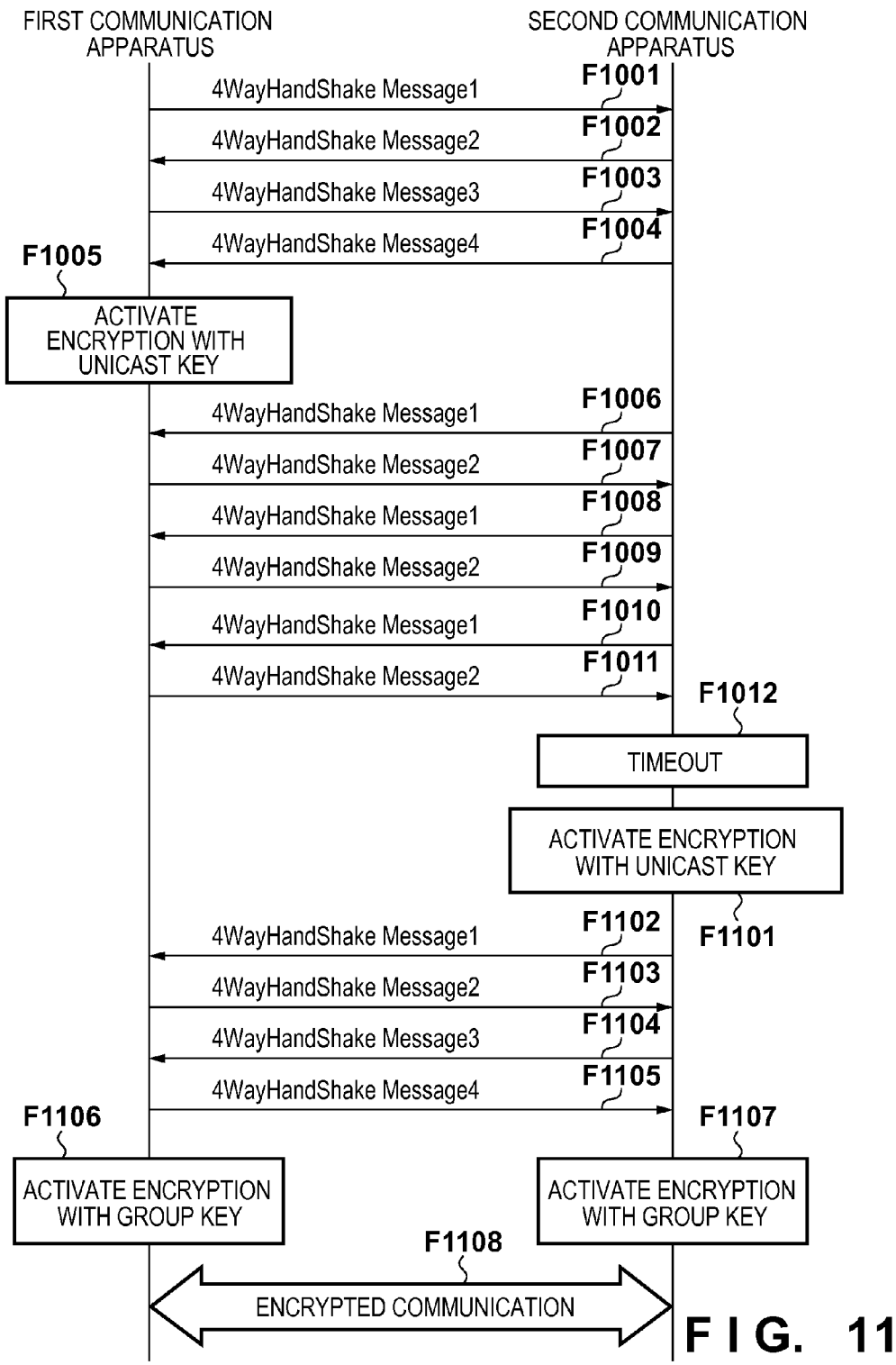
FIG. 11 is a sequence diagram illustrating one more example of operation of key exchange processing using a method according to the second embodiment.

Accordingly, the second communication apparatus is made to execute the processing according to this embodiment described in FIG. 9. That is, it is arranged so that at the moment the timeout occurs, the second communication apparatus activates unicast encryption-related processing in a manner similar to that of the first communication apparatus. The sequence diagram in this case is illustrated in FIG. 11. After the occurrence of timeout (F1012), the second communication apparatus activates unicast encryption-related processing (F1101). After activating unicast encryption-related processing, the second communication apparatus transmits Message 1 by encrypted communication (F1102) and receives a response to this message (F1103). Since the second communication apparatus has activated the unicast encryption-related processing, is can interpret the response (Message 2) received from the first communication apparatus, continues with the subsequent key exchange processing (F1104 to F1105) and can complete the key exchange. Following completion of the key exchange, the first communication apparatus and the second communication apparatus activate encryption-related processing that is based upon the group key (F1106, F1107). As a result, since encryption-related processing is activated in both the first and second communication apparatuses, execution of encrypted communication becomes possible (F1108).

Thus, processing according to this embodiment can be applied even in a case where an encrypted response is received from the communication apparatus of the other party and a timeout has occurred owing to the fact that this response cannot be interpreted. As a result, it is possible to eliminate the problem wherein even though the communication apparatus of the other party is capable of interpreting a message using plain text, key exchange processing cannot be completed owing to the fact that the response from this communication apparatus of the other party is encrypted.

It should be noted that this embodiment also is applicable to processing in which three or more communication apparatuses exchange an encryption key at one time. For example, any one of three or more communication apparatuses executes key exchange processing as the authenticator. From this point in time onward, the communication apparatus that has executed key exchange processing as the authenticator in the first execution of processing is capable of encrypting and transmitting a signal using the unicast key which it itself provides. In key exchange processing from the second time onward, therefore, if key exchange processing is left unfinished owing to the fact that the encrypted signal cannot be interpreted, at least either a time-out error or retry error can occur. Each communication apparatus therefore determines whether an error has occurred in the period of time from execution of key exchange processing from the second time onward until this processing is completed and, if an error has occurred, may activate processing relating to encryption based upon the unicast key acquired up to this point.

Third Embodiment

Figure 12:
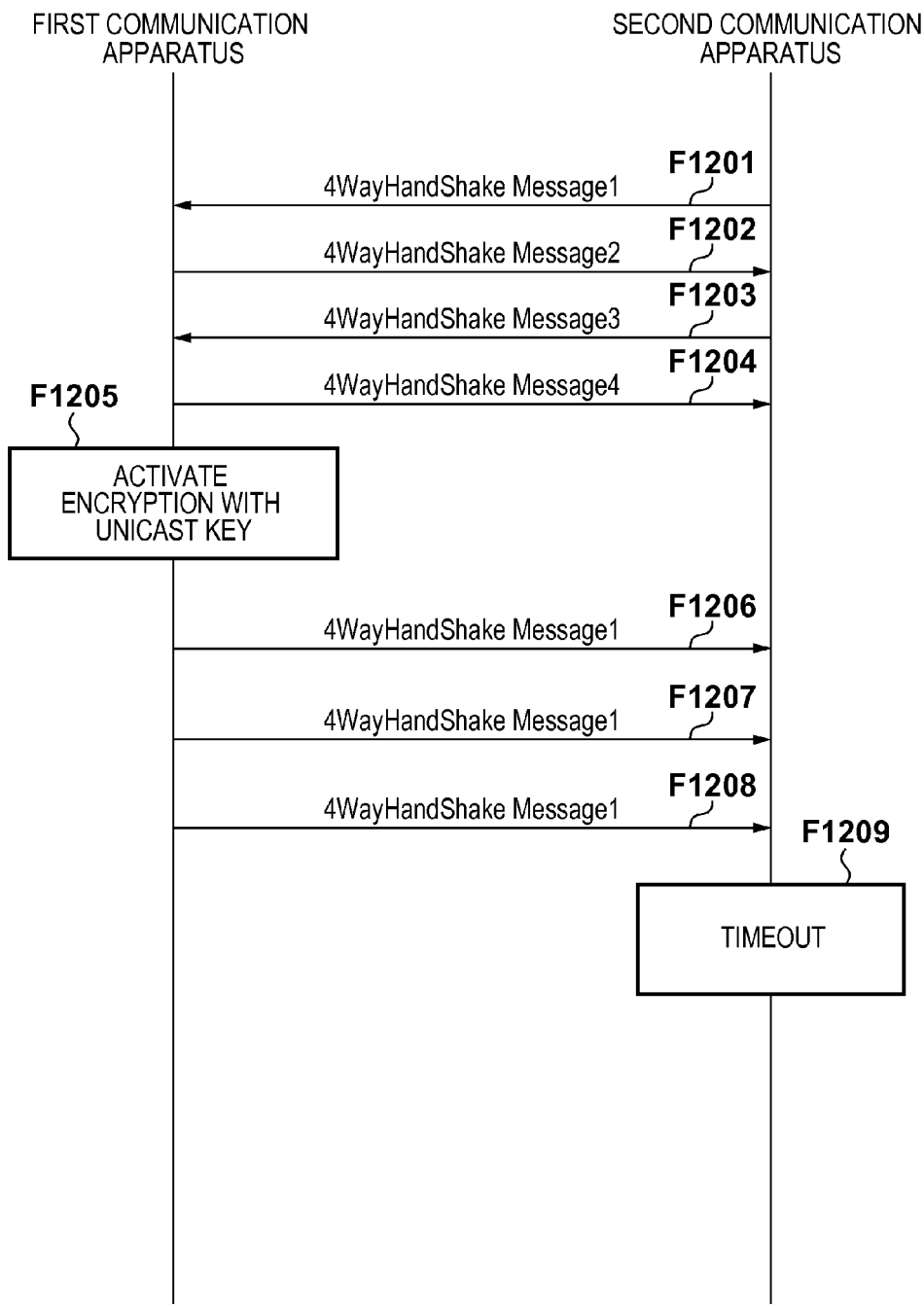
FIG. 12 is a sequence diagram illustrating one more example of operation of key exchange processing in a case where only one communication apparatus activates a process relating to encryption.

In the second embodiment, a description was rendered with regard to the case of Pattern 1 of FIG. 5 in which the first communication apparatus executes key exchange processing as the authenticator. In this embodiment, the case of Pattern 4 of FIG. 5 will be described. First, reference will be had to FIG. 12 to describe an instance where, in the case of Pattern 4 of FIG. 5, the first communication apparatus activates encryption-related processing after the completion of the first execution of key exchange processing. In Pattern 4, the unicast key exchanged by key exchange processing in the case where the second communication apparatus is the authenticator is a unicast key to be used by the first and second communication apparatuses.

In the description below, it is assumed, as in the second embodiment, that the implementation is such that when the first communication apparatus acquires the unicast key (PTK) that is to be used in the first execution of key exchange processing, the first communication apparatus activates processing relating to encryption according to this unicast key even though this is before the second execution of key exchange processing. Further, unless stated otherwise, it is assumed that the implementation is such that even if the second communication apparatus has acquired the unicast key to be used in the first execution of key exchange processing, processing relating to encryption according to this unicast key is activated after the second execution of key exchange processing.

Further, in Pattern 4, the first communication apparatus and second communication apparatus execute key exchange processing the first time (F1201 to F1204) with the first communication apparatus and second communication apparatus serving as the supplicant and as the authenticator, respectively. The unicast key (PTK) is shared between the first communication apparatus and the second communication apparatus, and the group key of the first communication apparatus is transmitted to the second communication apparatus using this unicast key. As mentioned earlier, when the first communication apparatus acquires the unicast key to be used in the first execution of key exchange processing, it activates encryption-related processing (F1205) based upon the unicast key even though this is before the second execution of key exchange processing.

After the first communication apparatus activates the encryption-related processing, the roles of the first communication apparatus and second communication apparatus are reversed and key exchange starts with the first communication apparatus and second communication apparatus serving as the authenticator and as the supplicant, respectively. It should be noted that since the first communication apparatus has activated encryption-related processing at F1205, it transmits the key exchange packet using encrypted text and not plain text (F1206). As mentioned earlier, even though the unicast key exchanged in the period of time during which the second communication apparatus is the authenticator is the unicast key to be used, the second communication apparatus will not activate encryption-related processing until the second execution of key exchange processing is completed. Accordingly, the second communication apparatus cannot recognize the packet of encrypted text from the first communication apparatus, discards this packet and does not respond. On the other hand, the first communication apparatus does not receive a response and therefore retransmits the key exchange packet (F1207, F1208).

The first communication apparatus performs retransmission of the key exchange packets a predetermined number of times. However, since all have been encrypted, the second communication apparatus cannot recognize them and all are discarded. The second communication apparatus then judges that the second key exchange will not be executed and eventually a timeout occurs (F1209). As a result, a problem which arises is that encrypted communication according to WPA cannot be established between the first and second communication apparatuses.

Accordingly, as illustrated in FIG. 13, the second communication apparatus of this embodiment activates encryption-related processing (F1301) with regard to the unicast key, in a manner similar to that of the first communication apparatus, on or after the moment at which the timeout occurs. As a result, it becomes possible for the second communication apparatus to recognize the key exchange packet received from the first communication apparatus. Consequently, the second communication apparatus sends a response back to the first communication apparatus (F1303) and key exchange processing continues (F1304, F1305). Following completion of the key exchange, the first communication apparatus and the second communication apparatus activate encryption-related processing that is based upon the group key (F1306, F1307). As a result, since encryption becomes possible in both the first and second communication apparatuses, encrypted communication becomes possible (F1308).

Reference will be had to FIG. 14 to describe the processing executed by the second communication apparatus in order to implement the sequence diagram shown in FIG. 13. First, the second communication apparatus detects the first communication apparatus (step S1401). If the first communication apparatus is not detected ("NO" at step S1401), the second communication apparatus continues waiting for a fixed period of time until the first communication apparatus is detected. If the first communication apparatus is detected ("YES" at step S1401), then the second communication apparatus determines whether key exchange has started from the first communication apparatus (step S1402).

In a case where the second communication apparatus determines that key exchange has started from the first communication apparatus ("YES" at step S1402), it executes key exchange processing (step S1409) with the first and second communication apparatuses serving as the authenticator and supplicant, respectively. The second communication apparatus then executes key exchange processing with the roles of the apparatuses being reversed (step S1410). In this embodiment, since the unicast key exchanged in a case where the second communication apparatus serves as the authenticator is the unicast key to be used by the first and second communication apparatuses, no difficulty arises as a result of one of the communication apparatuses activating encryption-related processing. Following the completion of the second execution of key exchange processing, therefore, the second communication apparatus activates encryption-related processing based upon the group key (step S1408) and then terminates processing. It should be noted that in actual processing, the second communication apparatus does not know which of the four patterns of FIG. 5 is applicable. At step S1402, therefore, the second communication apparatus may shift, if it determines that key exchange started from the first communication apparatus ("YES" at step S1402), processing to step S903 of FIG. 9.

On the other hand, in a case where the second communication apparatus determines that key exchange has not started from the first communication apparatus ("NO" at step S1402), key exchange processing starts with the second communication apparatus serving as the authenticator (step S1403). After the second communication apparatus completes key exchange processing with itself serving as the authenticator, it starts key exchange processing with the first communication apparatus serving as the authenticator (step S1404). The second communication apparatus ascertains (step S1405) whether at least one of a timeout error, which is ascribable to timing out of a predetermined timer, or a retry error, which is ascribable to completion of retransmission a predetermined number of times, has occurred.

In this embodiment, the first communication apparatus activates processing relating to unicast encryption, and the second communication apparatus does not activate processing relating to unicast encryption. That is, Message 1 of the four-way handshake transmitted by the first communication apparatus is encrypted text, but the second communication apparatus cannot interpret this text. Consequently, at least either the timeout error or retry error occurs ("YES" at step S1405). It should be noted that if an error does not occur ("NO" at step S1405), encryption-related processing that is based upon the encryption key finalized between the first and second communication apparatuses is activated (step S1408) and processing is then terminated.

On the other hand, in this example, since at least either of the timeout error or retry error is detected ("YES" at step S1405), the second communication apparatus activates encryption-related processing (step S1406) that is based upon the unicast key acquired by the key exchange processing of step S1403. Thereafter, the second communication apparatus executes key exchange processing again (step S1407) with itself serving as the supplicant and the first communication apparatus serving as the authenticator. The first communication apparatus subsequently executes encryption-related processing based upon the encryption key (step S1408) and then terminates processing.

It should be noted that there is a case where the first communication apparatus has already terminated key exchange processing at the moment encryption-related processing is activated in the second communication apparatus. In such case, the second communication apparatus, as shown in FIG. 15, activates encryption-related processing (F1301) based upon the unicast key in a manner similar to that of the first communication apparatus, and may thereafter execute key exchange (F1501 to F1504) in encrypted text with the second communication apparatus serving as the authenticator again. Thereafter the first communication apparatus and the second communication apparatus may reverse their roles and execute key exchange processing (F1505 to F1508), activate encryption-related processing based upon the group key (F1509, F1510) and perform encrypted communication (F1511).

It should be noted that in this case, even though the second communication apparatus with itself serving as the supplicant waits for Message 1 of the four-way handshake from the first communication apparatus, it cannot receive this message at step S1407 of FIG. 14. Consequently, after step S1407, the second communication apparatus may, for example, determine whether Message 1 has been received from the first communication apparatus within a predetermined period of time and, if the message has not been received, may again execute key encryption with itself acting as the authenticator. The second communication apparatus may then execute key exchange processing again with itself acting as the supplicant after it completes key exchange processing with itself acting as the authenticator.

Thus, in this embodiment, if timeout is sensed in the second execution of key exchange processing after the first execution of key exchange processing is completed, encryption-related processing is activated and the second execution of key exchange processing is executed again. As a result, when the unicast key to be used is acquired in the first execution of key exchange processing, it is possible to accomplish execution of key exchange processing multiple times between a communication apparatus that executes encryption even before the second execution of key exchange processing and a communication apparatus that executes encryption following the completion of the second execution of key exchange processing. Accordingly, even if the implementation regarding the operation of key exchange processing differs between the communication apparatuses, multiple executions of the key exchange process (two times) and encrypted communication can be executed.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-104883 filed on May 1, 2012, which is hereby incorporated by reference herein in its entirety.

What is claimed is:

1. A communication apparatus, comprising:
a CPU coupled to a memory, wherein the CPU controls the communication apparatus to:
perform a first process for sharing a first encryption key between the communication apparatus and a second communication apparatus, with the first process initiated by the second communication apparatus;
perform a second process for transmitting a second encryption key without activating the first encryption key to the second communication apparatus, with the second process initiated by the communication apparatus, in a case where the first encryption key is shared;
perform a third process for transmitting the second encryption key encrypted by activating the first encryption key to the second communication apparatus, with the third process initiated by the communication apparatus, in a case where an error occurs in the second process, and not perform the third process in a case where the second process succeeds; and activate the second encryption key for communication between the communication apparatus and the second communication apparatus after sharing of the second encryption key.

2. The apparatus according to claim 1, wherein the first process, the second process, and the third process are four-way handshake for sharing a unicast key and a group key.

3. The apparatus according to claim 1, wherein an apparatus starting the first process differs from an apparatus starting the second process, and wherein the apparatus starting the second process is the same as an apparatus starting the third process.

4. The apparatus according to claim 1, wherein the CPU further controls the communication apparatus to determine whether the communication apparatus operates as an authenticating side apparatus or an authenticated side apparatus in the first process.

5. The apparatus according to claim 1, wherein the first process, the second process and the third process are compliant with IEEE802.11 standard series.

6. The apparatus according to claim 1, wherein the first encryption key and the second encryption key are encryption keys for performing wireless communication in an ad hoc mode compliant with IEEE802.11 standard series.

7. A control method of a communication apparatus, comprising:

performing a first process for sharing a first encryption key between the communication apparatus and a second communication apparatus, with the first process initiated by the second communication apparatus;

performing a second process for transmitting a second encryption key without activating the first encryption key to the second communication apparatus, with the second process initiated by the communication apparatus, in a case where the first encryption key is shared;

in a case where an error occurs in the second process, performing a third process for transmitting the second encryption key encrypted by activating the first encryption key to the second communication apparatus, with the third process initiated by the communication apparatus, while the third process is not performed in a case where the second process succeeds; and activating the second encryption key for communication between the communication apparatus and the other communication apparatus after sharing of the second encryption key.

8. A non-statutory computer-readable storage medium storing a computer program for causing a computer to perform a method comprising:

performing a first process for sharing a first encryption key between the communication apparatus and a second communication apparatus, with the first process initiated by the second communication apparatus;

performing a second process for transmitting a second encryption key without activating the first encryption key to the second communication apparatus, with the second process initiated by the communication apparatus, in a case where the first encryption key is shared;

in a case where an error occurs in the second process, performing a third process for transmitting the second encryption key encrypted by activating the first encryption key to the second communication apparatus, with the third process initiated by the communication apparatus, while the third process is not performed in a case where the second process succeeds; and activating the second encryption key for communication between the communication apparatus and the second communication apparatus after sharing of the second encryption key.

* * * * *